United States Patent [19]

Nagano

[11] Patent Number: 4,642,072
[45] Date of Patent: Feb. 10, 1987

[54] DERAILLEUR FOR A BICYCLE
[75] Inventor: Masashi Nagano, Izumi, Japan
[73] Assignee: Shimano Industrial Company Limited, Osaka, Japan
[21] Appl. No.: 563,578
[22] Filed: Dec. 20, 1983
[30] Foreign Application Priority Data Dec. 27, 1982 [JP] Japan .................................. 57-229404
Dec. 28, 1982 [JP] Japan .................................. 57-234456

[51] Int. Cl.[4] .............................................. F16H 9/00
[52] U.S. Cl. .......................................... 474/82; 474/80
[58] Field of Search .................................... 474/80, 82

[56] References Cited
U.S. PATENT DOCUMENTS
4,027,542 6/1977 Nagano ................................. 474/82

FOREIGN PATENT DOCUMENTS
0013647 7/1980 European Pat. Off. .
0032049 7/1981 European Pat. Off. .
0047927 3/1982 European Pat. Off. .
2654246 6/1977 Fed. Rep. of Germany .
2719241 11/1977 Fed. Rep. of Germany .
2027503 2/1980 United Kingdom .
1581932 12/1980 United Kingdom .
2057071 3/1981 United Kingdom .

Primary Examiner—James A. Leppink
Assistant Examiner—Frank McKenzie
Attorney, Agent, or Firm—Stevens, Davis, Miller & Mosher

[57] ABSTRACT

A derailleur for a bicycle having a derailleur body having a base member, a movable member having a chain guide, and a support means for supporting the movable member movably axially of a multistage sprocket assembly with respect to the base member; and a control cable for movably controlling the movable member, whereby an amount of movement of the chain guide in the axial direction of a multistage sprocket assembly is made adjustable with respect to a constant control amount of the control cable.

10 Claims, 22 Drawing Figures

DERAILLEUR FOR A BICYCLE

FIELD OF THE INVENTION

This invention relates to a derailleur for a bicycle, and more particularly, to a derailleur for a bicycle which shifts a driving chain from one to another sprocket at a multistage sprocket assembly mounted mainly to a rear wheel hub at the bicycle for changing its speed.

BACKGROUND OF THE INVENTION

Conventionally, a derailleur for a bicycle comprises a base member, a movable member having a chain guide, and a support means composed mainly of a pair of linkage members for supporting the movable member movably axially of a multistage sprocket assembly, so that an operating means mainly comprising a control cable is operated to move the movable member through the support means and the driving chain guided by the chain guide is shifted from one to another sprocket at the multistage sprocket assembly for changing the bicycle speed.

The derailleur constructed as foregoing and using a positioning means comprising a plurality of engaging portions and an engaging member engageable with one of the engaging portions has been well-known, with the engaging portions being provided at one of two members movable relative to each other during the movement of the movable member and the engaging member being provided at the other to thereby set the speed change position of the movable member, in turn the chain guide, and maintain the set position.

In a case of using such positioning means, the chain guide has been set of an amount of movement and has to move in every preset amount. Hence, for the multistage sprocket assembly whose each sprocket is spaced at an interval to mate the amount of movement of chain guide, the chain guide can stop at the position corresponding to the widthwise center line of each sprocket, which is not problematical. However, for the multistage sprocket assembly not constructed as the above, the chain guide during the speed change cannot be stopped at the proper position corresponding to the widthwise center line of each sprocket.

Therefore, there has been the problem in that the speed change capability deteriorates, or the driving chain, even when shifted, gets out of the proper position to generate sounds due to contact with the sprocket. Hence, in order to solve the above problem, various derailleurs have been contentionally been required which can move the chain guide corresponding properly to the interval between each sprocket. On the other hand, in some cases that the positioning means is provided not at the derailleur but at the control cable, or a display means instead of the positioning means is provided at the control cable, the above problem remains unsolved.

SUMMARY OF THE INVENTION

In the light of the above conventional problem, this invention has been designed. An object of the invention is to provide a derailleur for the bicycle which can operate an operating means in a constant amount to move the chain guide and adjust the amount of movement of the chain guide with respect to each sprocket at the multistage sprocket assembly so that, even when the interval between the respective sprockets changes, the chain guide operated in a constant amount by the operating means can be maintained at the proper position with respect to each sprocket.

This invention is characterized in that the derailleur for the bicycle comprises a derailleur body provided with a base member, a movable member having a chain guide, and a support means supporting the movable member movably axially of the multistage sprocket assembly; and an operating means for moving the movable member at the derailleur body is provided with an adjusting means for adjusting the movement of the movable member by the regular control amount of the operating means with respect to the multistage sprocket assembly.

The derailleur body can include a positioning maintaining means to determine the chain guide in position. The positioning and maintaining means comprises a positioning plate having a plurality of engaging portions corresponding to the number of sprockets at the multistage sprocket assembly and an engaging member engageable with one engaging portion. The adjusting means, when the positioning and maintaining means is provided, moves one of the positioning plate and engaging member with respect to the other so that one engaging portion has a width to allow the engaging member to shift its engaging position widthwise of each engaging portion.

Besides this, in the derailleur using linkage members as the support means to form a linkage mechanism, the linkage mechanism may be used to adjust the amount of movement of the chain guide with respect to the regular control of the operating means. In this case, an arm separate from the linkage mechanism is used, which will be apparent from the drawings and embodiments to be discussed below.

Thus, the adjusting means is operated only to thereby enable the chain guide to be adjusted of its movement in the axial direction of the sprocket assembly with respect to the regular control of the operating means, whereby one derailleur can always position the chain guide properly to each sprocket at another sprocket assembly which is different in interval between each sprocket from that of the former derailleur.

Accordingly, there is no need of preparing plural kinds of derailleurs for the multistage sprocket assemblies different from each other in interval between the respective sprockets, so that a single derailleur is applicable to such multistage sprocket assemblies. Hence, the derailleur is economically advantageous, always superior in the speed change capability, and free from generation of sounds caused by contact of the chain with the sprocket.

These and other objects of the invention will become more apparent in the detailed description and examples which follow.

BRIEF DESCRIPTION OF THE DRAWINGS

FIGS. 7 through 9 show a modified embodiment of the invention, which allows an engaging member to move, in which FIG. 7 is a bottom view of a principal portion of the modified embodiment, corresponding to FIG. 4, FIG. 8 is a longitudinal sectional view of the same, FIG. 9 is an illustration for adjustment of the engaging position of each engaging portion with an engaging member, FIGS. 14 through 18 are views of still another modified embodiment of the invention, in which FIG. 14 is a partially cutaway bottom view thereof, corresponding to FIG. 2, FIG. 15 is a partially cutaway and omitted rear view of the same, FIG. 16 is a plan view of a base member only, FIGS. 17 and 18 are illustrations of a linkage mechanism which is transformed by an arm, FIGS. 19 through 22 are views of a further modified embodiment, in which FIG. 19 is partially cutaway bottom view thereof, FIGS. 20 and 21 are illustrations of operating condition of the derailleur, and FIG. 22 is a perspective exploded view of the same.

DETAILED DESCRIPTION OF THE INVENTION

Figure 1:
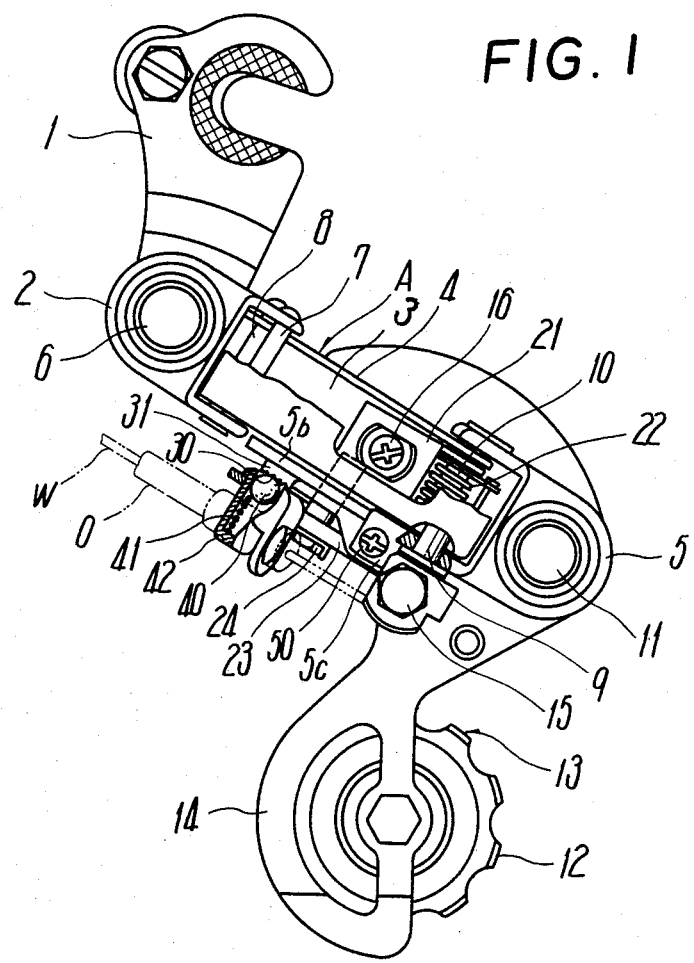
FIG. 1 is a partially cutaway front view of an embodiment of a derailleur of the invention.
Figure 2:
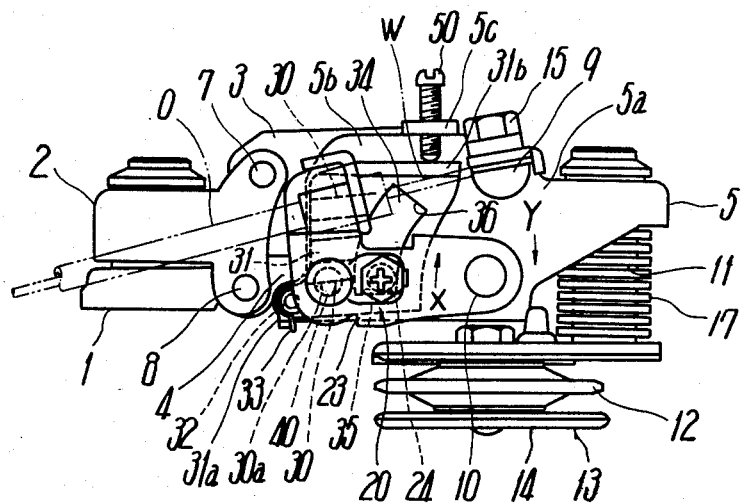
FIG. 2 is a bottom view of the FIG. 1 embodiment.
Figure 3:
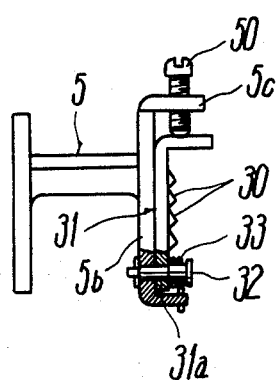
FIG. 3 is a partially cutaway side view of a principal portion of the same.

Referring to FIGS. 1 and 2, a rear derailleur is shown, which basically comprises a fixing member 1, and a derailleur body A pivotally supported thereto and comprising four members: a base member 2, two linkage members 3 and 4 parallel to the base member 2, and a movable member 5. The fixing member 1 is to be fixed to the fork end of a bicycle, with the base member 2 being supported swingably to the fixing member 1 through a horizontal shaft 6.

Such derailleur of typical construction may not have the fixing member 1, and the linkage members 3 and 4 constituting a support means supporting the movable member 5 movably axially of the multistage sprocket assembly are not defined.

Next, the derailleur constructed as abovementioned will be detailed.

At first, the base member 2 is provided at one side with a pair of mounting segments opposite to each other. The linkage members 3 and 4 are pivoted to the mounting segments through a pair of pins 7 and 8; movable member 5 is pivoted to the free ends of linkage members 3 and 4 through a pair of pins 9 and 10.

The movable member 5 is similar in shape to the base member 2 and is provided at one side with mounting segments which are opposite to each other and pivoted to the linkage members 3 and 4 swingably to each other through two pins 9 and 10 supported to the mounting segments. At the other side of movable member 5, a chain guide 13 having a guide pulley (not shown) and a tension pulley 12 is mounted rotatably only in the predetermined range through a horizontal shaft 11 extending in parallel to the horizontal shaft 6, so that the movable member 5 moves in a parallel manner with respect to the base member 2 from the high speed stage in FIG. 2 to the low speed stage (not shown) through parallelogrammic motion of linkage members 3 and 4.

The chain guide 13 comprises a guide pulley, tension pulley 12, and a change-over frame 14 for rotatably supporting these pulleys, the change-over frame 14 being supported swingably to the movable member 5 through the horizontal shaft 11.

The derailleur body A in FIG. 1 is provided with an energy conservation mechanism 20 which is operative of a control wire W and capable of storing the operating force therefor even when a resistance against speed change is larger than that when the chain is normally travelled.

The engaging conservation mechanism 20, as is well-known, comprises a pair of energy conservation plates 21, an energy conservation spring 22 interposed therebetween, and an operating arm 23 having an interlocking lever 24. The energy conservation plates 21 are pivotally supported to the pin 10 for pivotting the movable member 5 to one linkage member 4 and disposed outside and inside the linkage members 3 and 4 so that the energy conservation spring 22 biases the energy conservation plates 21 toward the linkage member 4. The operating arm 23 is supported to the pin 10, and the interlocking lever 24 is interposed at its utmost end between the energy conservation plates 21. Control wire W is fixed at its terminal to a fixture 15 supported to the pin 9, and an outer sheath O guiding the wire W is supported to the operating arm 23, the wire W being operated to allow one energy conservation plate 21 to swing together with the operating arm 23 with respect to the derailleur body A to thereby previously switch the derailleur to a desired speed change stage. When the aforesaid large resistance against speed change is eliminated and the chain starts its movement, a restoring force of energy conservation spring 22 moves the chain guide 13 to the speed change stage previously switched by the operation of control wire W. In a case where a normal resistance against speed change is applied, the chain guide 13 swings integrally with the linkage member 4 through the energy conservation spring 22. In addition, the energy conservation mechanism 20 is not indispensible.

In a case where no energy conservation mechanism 20 is used, the outer sheath O is supported to, for example, the linkage member 4 or base member 2.

Now, the derailleur shown in FIGS. 1 and 2 uses the energy conservation mechanism 20 and is provided with a positioning and maintaining means and an adjusting means to be discussed below.

In detail, in FIGS. 1 and 2, a one-side mounting segment 5a of movable member 5 extends toward the base member 2 to form an extension 5b. At the outer surface of utmost end of extension 5b is disposed a positioning plate 31 having a plurality of engaging portions corresponding in number to the sprockets, and an engaging member 40 which is engageable selectively with one of engaging portions 30 and which is mounted to the operating arm 23 at the energy conservation mechanism 20. Positioning plate 31 and engaging member 40 constitute the positioning and maintaining means.

The positioning plate 31 is pivoted to the fore end of extension 5b through a pivot pin 32 parallel to the pin 10, and the extension 5b is provided with an adjusting means comprising an adjusting screw 50 for adjusting the swinging position of positioning plate 31 and the engaging position of engaging member 40 with the respective engaging portions 30.

In further detail, the engaging portions 30 are formed of recesses or elongate slots of the same number as the speed change stages, the positioning plate 31 being provided at one end with a pivot portion 31a for the extension 5b and at the other end with a stopper 31b to abut against the adjusting screw 50. The engaging portions 30 are juxtaposed on the outer surface of positioning plate 31 in relation of being spaced at predetermined intervals in the direction of swinging motion of movable member 5, and between the positioning plate 31 and the movable member 5 is provided a spring 33 for biasing the positioning plate 31 toward the adjusting screw 50, the positioning plate 31 being provided with a circular-arc-shaped guide bore 34 for guiding the interlocking lever 24 and with a pair of restricting portions 35 and 36. In addition, the extension 5b of course provides a through bore (not shown) not interfering with the interlocking lever 24.

Also, the engaging member 40 uses a rolling element such as a ball or roller, the rolling element being held to the operating arm 23 through a spring 41 and a cylindrical holder 42 as shown in FIG. 1.

Alternatively, the engaging member 40 may be integral with the operating arm 23. In this case, the operating arm 23 is made elastically displaceable, or the positioning plate 31 is made so.

Figure 4:
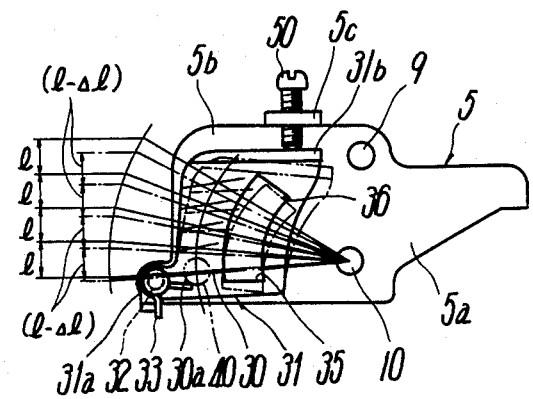
FIG. 4 is a bottom view of the same.

The adjusting screw 50 screws with a nose 5c provided at the extension 5b of movable member 5 and abuts at the utmost end against the stopper 31b at the positioning plate 31. Hence, the adjusting screw 50 screws forwardly to swing the positioning plate 31 clockwise as shown in FIGS. 2 and 4 against the spring 33. As a result, the engaging position of engaging member 40 with each engaging portion 30 is adjusted to thereby reduce an amount of movement of movable member 5, and in turn of the chain guide 13, set by the positioning and maintaining means. Also, adjusting screw 50 screws backwardly to move the positioning plate 31 counterclockwise in FIGS. 2 and 4 by a restoring force of spring 33. As a result, the engaging position of engaging member 40 with each engaging portion 30 is adjusted to increase the amount of movement of chain guide 13.

In addition, in FIGS. 1 and 2, reference numeral 16 designates an adjusting screw which adjusts the initial position, i.e., the speed change position, of chain guide 13 set by the positioning and maintaining means with respect to the base member 2, and 17 designates a tension spring biasing the chain guide 13 clockwise in FIG. 1.

Also, the control wire W mainly uses a push-pull-type wire less in flexibility.

Next, explanation will be given concerning operation of the derailleur constructed as foregoing.

In FIGS. 1 and 2, the chain guide 13 is positioned corresponding to the widthwise center line of the smallest diameter sprocket, with the engaging portions 30 engaging at the high stage 30a with the engaging member 40 as shown in FIGS. 2 and 4. Upon pulling the control wire W in this state, a distance between the control wire fixture 15 and the outer sheath holder at the operating arm 23 is reduced so that the operating arm 23 is intended to swing in the direction of the arrow X in FIG. 2, but the linkage members 3 and 4, when subjected to the normal resistance against speed change, swing in the direction of the arrow Y in FIG. 2 so as to move the movable member 5 and chain guide 13 toward the larger diameter sprocket. Also, the engaging member 40 disengages from the high stage engaging portion 30a and then engages with the next lower stage engaging portion. The chain guide 13, as shown in FIG. 5, moves in every movement amount 1 set by the positioning and maintaining means and stops in the position corresponding to the widthwise center line of a desired larger diameter sprocket.

When the wire W is pushed from the state where the chain guide 13 has moved toward the larger diameter sprocket, the distance between the wire W fixture 15 and the outer sheath O holder is increased to swing the linkage members 3 and 4 in the direction of the arrow X in FIG. 2 so as to move the movable member 5 and chain guide 13 toward the smaller diameter sprocket, with the result that the engaging member 40 disengages from the lower stage engaging portion and engages again with the high stage engaging portion 30a. Thus, the chain guide 13 moves in every movement amount set by the positioning and maintaining means and stops in the position corresponding to the widthwise center line of a desired smaller diameter sprocket.

Figure 5:
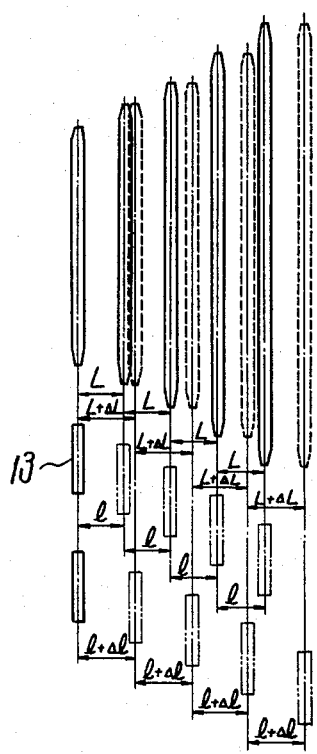
FIGS. 5 and 6 are illustrations showing the relation between the positions of multistage sprocket and chain guide.

Next, in a case where the interval between the respective sprockets, as shown by the broken line in FIG. 5, becomes larger by $\Delta L$ than that L shown by the solid line so that the movement amount l of chain guide 13 set by the positioning and maintaining means becomes smaller by $\Delta l$ than the interval $L+\Delta L$ between the widthwise center lines of respective sprockets, the adjusting screw 50 is screwed backwardly to swing the positioning plate 31 counterclockwise in FIGS. 2 and 4 by the spring 33, thereby adjusting the engaging position of engaging member 40 with each engaging portion 30. Thus, the amount of movement of chain guide 13 is increased by $\Delta l$ to be $l+\Delta l$, thereby mating the interval $L+\Delta L$ between the widthwise center lines of respective sprockets.

Figure 6:
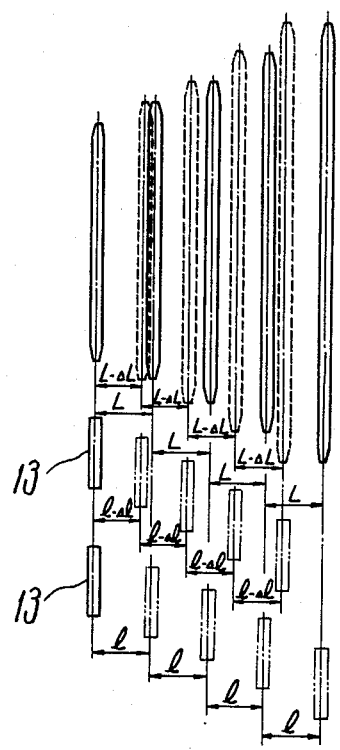

In a case where the amount of movement of chain guide 13 set by the positioning and maintaining means is smaller by $\Delta l$ than the interval L as shown in FIG. 6, the adjusting screw 50 is screwed forwardly to swing the positioning plate 31 clockwise against the spring 33 and adjust it in the position shown by the chain line in FIG. 4, whereby the engaging position of engaging member 40 with each engaging portion 30 is adjusted to reduce the amount of movement of chain guide 13 set by the positioning and maintaining means, only by $\Delta l$ to be $l-\Delta l$, thereby mating the interval $L-\Delta L$.

Figure 7:
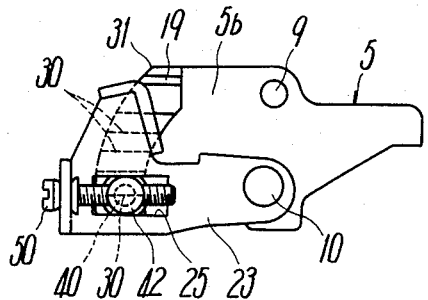
Figure 8:
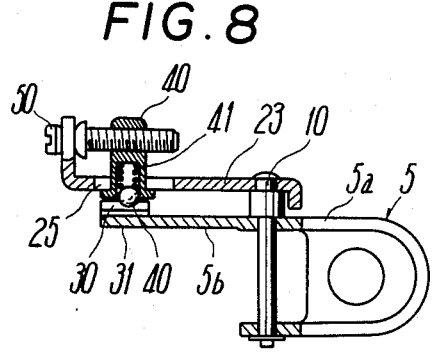
Figure 9:
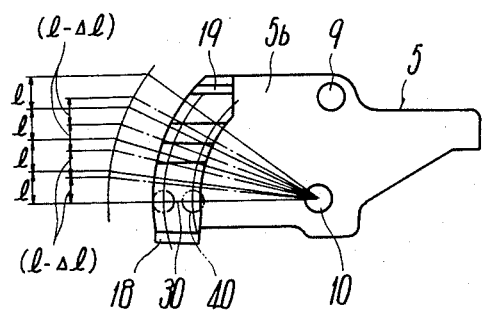

Alternatively, the engaging member 40 in the above embodiment may be made movable. In this case, the positioning plate 31, as shown in FIGS. 7 and 9, is integral with the extension 5b of movable member 5 and has the engaging portions 30, the operating arm 23 carries the adjusting screw 50 rotatably only, and an elongate slot 25 is provided at the position where the holder 42 is supported to the operating arm 23, so that the holder 42 is made movable widthwise of each engaging portion 30. Hence, the adjusting screw 50 screws with the holder 42, and the engaging member 40 carries thereby is moved widthwise of each engaging portion 30 of recess or elongate slot and adjusted of its engaging position therewith. In addition, reference numerals 18 and 19 designate stoppers provided at the positioning plate 31.

Figure 10:
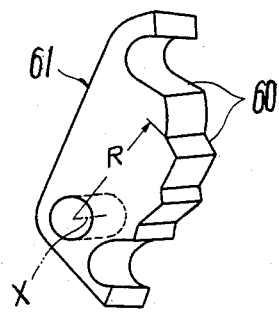
FIG. 10 is an illustration of a positioning plate only, different in shape.

Alternatively, a positioning plate 61 may, as shown in FIG. 10, be provided with a cam face eccentric with respect to the axis of swinging motion of positioning plate 61, the cam face being provided with engaging portions 60 of the same number as the speed change stages. Each engaging portion 60 extends in parallel to the axis X of swinging motion of positioning plate 61 and slopes outwardly (in the direction R). Positioning plate 61 is pivoted to, for example, the extension 5b of movable member 5, and the positioning plate 61 or the engaging member 40 is made movable in parallel to the axis X of swinging motion of positioning plate 61, so that the engaging position of engaging member 40 with each engaging portion 60 is adjusted.

Figure 11:
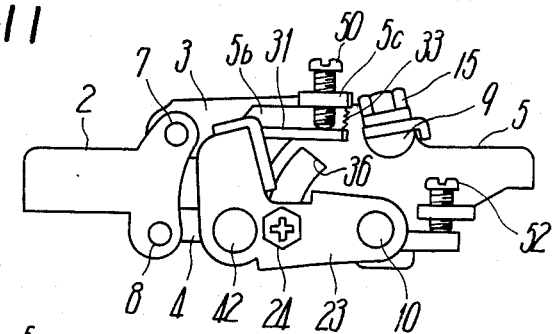
FIGS. 11 through 13 are partially omitted views explanatory of another modified embodiment of the invention.
Figure 12:
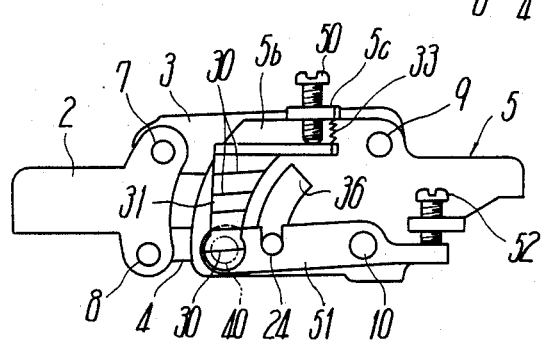
Figure 13:
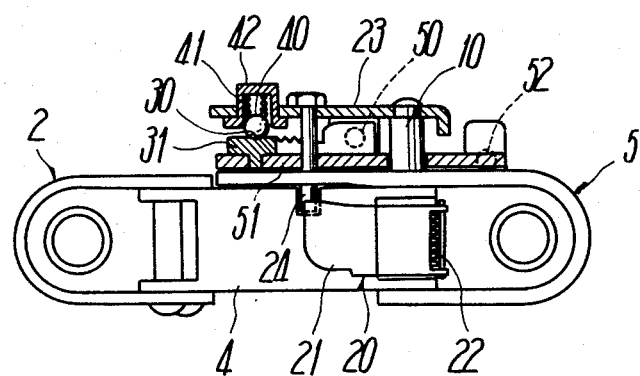

Alternatively, for example, a position changing means, which is changeable of the positions of positioning plate 31 having the engaging portions 30 and of the engaging member 40 with respect to the derailleur body A, may be provided as shown in FIGS. 11 through 13, thereby adjusting the movable member 5 in its position with respect to the base member 2. In detail, an adjusting arm 51 is pivoted to the pin 10, and a positioning plate 31 having the engaging portions 30 is pivoted to one end of adjusting arm 51. At the other end thereof or at the movable member 5 (in FIGS. 11 to 13, at the latter) is provided an adjusting means like an adjusting screw 52, and an adjusting means like the adjusting screw 50 is provided at the opposite end of positioning plate 31 to the adjusting arm 51 supporting position or the movable member 5 (in the drawings, at the latter), so that the screw 52 is operated to swing the adjusting arm 51 around the pin 10 to thereby actuate the positioning plate 31 together with the operating arm 23 carrying the engaging member 40. In addition, in a case where the engaging portions 30 are provided at the cam face of positioning plate 61, the engaging portions 60 are changed in shape to enable adjustment of movable member 5 in position with respect to the base member 2.

Alternatively, the engaging portions 30 may be provided at one linkage member 3 or 4 and the engaging member 40 may be provided at the other, the base member 2, or the movable member 5. Also, the engaging portions 30 may be provided at the base member 2 and the engaging member 40 at the linkage member 3 or 4, or the movable member 5. Or, the engaging portions 30 may be provided at the movable member 5 and the engaging member 40 at the base member 2 or one linkage member 3. In brief, the engaging portions 30 need only be provided at one of two members moving relative to each other while the movable member 5 is moving and the engaging member 40 at the other.

Alternatively, the engaging portions 30 and engaging member 40 at the positioning and maintaining means may not change the relative positions to each other, but utilize a linkage mechanism constituting the derailleur body A so that the degree of transformation of linkage mechanism, in other words, the amount of movement of chain guide 13 per one pitch set by the engaging portions 30, may be adjusted:

In this case, the derailleur body A includes the linkage mechanism comprising the base member 2, pair of linkage members 3 and 4 and movable member 5, and an arm 70 separate from the derailleur body A is provided to transform the linkage mechanism.

Figure 14:
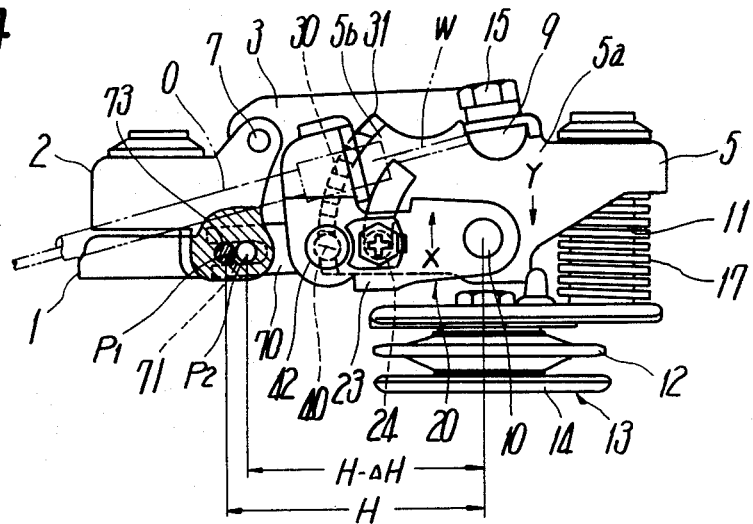
Figure 15:
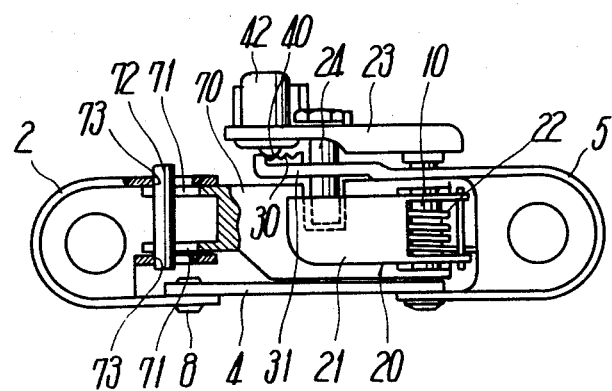
Figure 16:
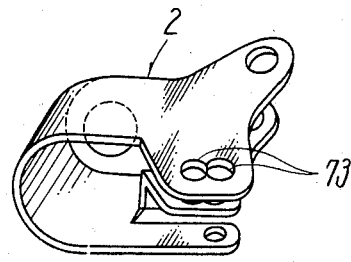
Figure 17:
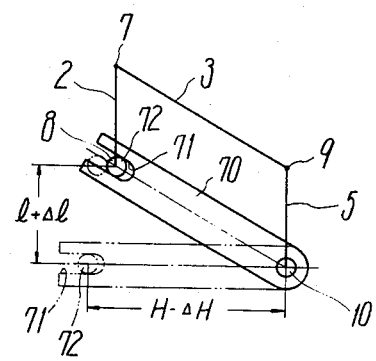
Figure 18:
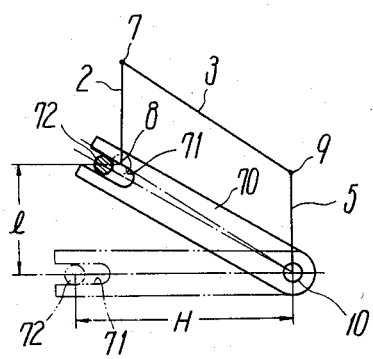
Figure 19:
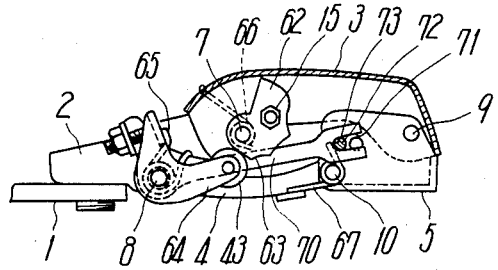
Figure 20:
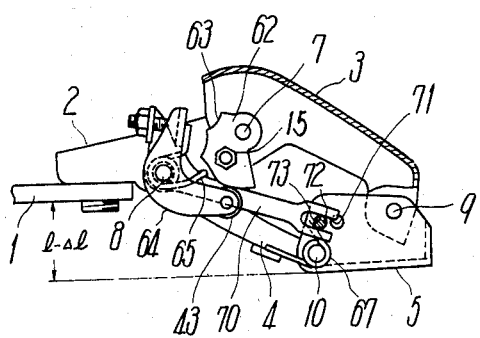
Figure 21:
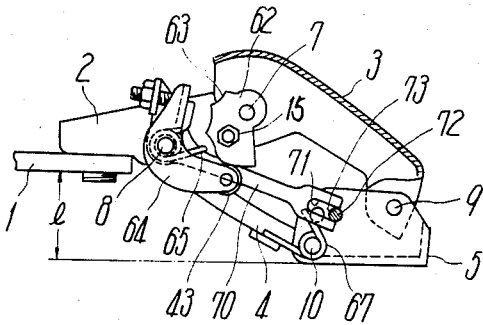
Figure 22:
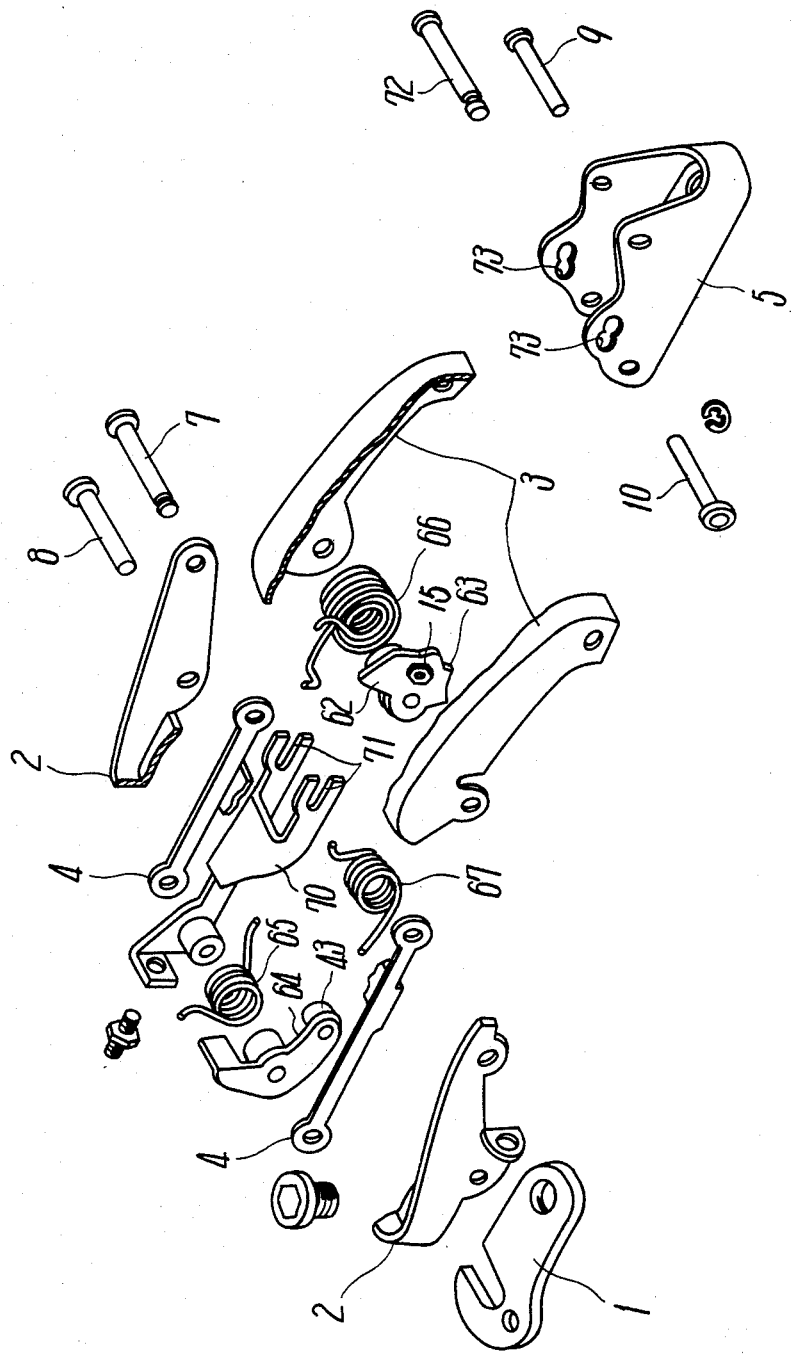

Referring to FIGS. 14 through 16, the arm 70 is added to the embodiment shown in FIGS. 1 through 4. The arm 70 may be pivoted at one end thereof to one of two members moving relative to each other when the movable member 5 moves due to parallelogrammic movement of linkage mechanism, connected at the other end to the other of the aforesaid two members in relation of being adjustable of engaging position, and provided with the engaging member 40 or positioning plate 31, and also fix the wire W or outer sheath O, so that the adjustment of engaging position by the arm 70 controls the movement of movable member 5 set by the positioning means.

The arm 70 in FIGS. 14 through 16 is pivoted at one end to the pin 10 and provided at the other end with a recessed adjusting portion 71. At base member 2 are provided a plurality of adjusting bores 73 by which a connecting member 72, such as a pin, engageable with the adjusting portion 71 is retained in relation of being changeable in position. Connecting member 72 is retained selectively to the adjusting bore 73 and connects the arm 70 to the base member 2 in relation of being changeable of the engaging position. Engaging member 40 is mounted to the arm 70, and the outer sheath O is fixed thereto through the operating arm 23. Control wire W is fixed to the movable member 5 through a fixture 15.

In addition, in FIGS. 14 through 16, an energy conservation mechanism 20 is provided as the same as in the embodiment in FIGS. 1 through 4, in which the engaging member 40 is provided at the operating arm 23 and interlocked with the arm 70 through the energy conservation mechanism 20.

In the aforesaid construction, when the control wire W is pulled in the state shown in FIG. 14, the arm 70 swings clockwise around the connecting member 72 through the energy conservation mechanism 20, whereby the linkage mechanism is transformed to allow the movable member 5 to move in every regular amount set by the positioning means.

In this state, the engaging position of connecting member 72 with the adjusting bore 73 is changed to enable the arm 70 to change in its effective length, for example, from H to H$-\Delta$H as shown in FIG. 14, whereby the amount of movement of movable member 5 set by the positioning means is adjustable.

In the above embodiment, the adjusting portion 71 at the arm 70, adjusting bore 73 and connecting member 72, constitute an adjusting means of the invention.

In other words, in a case where the interval L between the respective sprockets increases by $\Delta$L so that L$+\Delta$L is larger than the amount 1 of movement of chain guide 13 as shown by the broken line in FIG. 5, the position where the connecting member 72 is fitted into the adjusting bore 73 is changed from the point $P_1$ to $P_2$ as shown in FIG. 14 to thereby reduce an effective length of arm 70 to H$-\Delta$H, and the amount of movement of the movable member 5, in turn the chain guide 13, that is, the amount 1 of movement set by the positioning and maintaining means, is increased by 1 to be 1$+\Delta$1, thereby mating the interval L$+\Delta$L between the respective sprockets.

On the contrary, when the interval L between the respective sprockets is reduced, the position where the connecting member 72 is fitted into the adjusting bore 73 is returned from $P_2$ to $P_1$ so that the effective length of arm 70 is made H and the amount of movement of chain guide 13 set by the positioning and maintaining means is made 1. In addition, two adjusting bores 73 are provided in this embodiment, which may alternatively be three or more.

Alternatively, the arm 70 may be supported to two members, such as the base member 2 and linkage member 3 or 4 or movable member 5, with the linkage members 3 and 4, or the movable member 5 and linkage member 3 or 4, moving relative to each other during the movement of linkage mechanism in a parallelogrammic manner. Or, the arm 70 may be supported to one of pins 7 through 10 and one of four members constituting the derailleur body A, one of the four members and a member supported thereto, or two members supported to two of the four members. In brief, the arm 70 need only be actuated by operating the control wire W to enable the derailleur body A to move in a parallelogrammic manner.

Also, the control wire W or outer sheath O, not fixed to the arm 70, may alternatively be supported to any one of the base member 2, linkage member 3 or 4 and movable member 5. In brief, the control wire W need only be operated to actuate the arm 70 to thereby transform the derailleur body A.

The control wire W or outer sheath O retained to the operating arm 23 at the energy conservation mechanism 20 as abovementioned, if the mechanism 20 is not used, need only be retained directly to the arm 70.

In a case where the positioning plate at the positioning and maintaining means is constituted of the cam body having the cam face as shown in FIG. 10, a positioning plate 62 may be pivoted to, for example, the pin 7 as shown in FIGS. 19 through 22 and provided with the fixture 15 for the control wire W. An energy conservation arm 64 having an engaging member 43 engageable with one of engaging portions 63 provided at the cam face of positioning plate 62 may be provided. Energy conservation arm 64 and arm 70 may be pivoted to the pin 8, and an energy conservation spring 65 may be interposed between the energy conservation arm 64 and the arm 70, to bias the energy conservation arm 64 in the direction of engaging the engaging body 43 always with each engaging portion 63. Arm 70 may be connected at the other end to the movable member 5 in relation of being changeable of the engaging position.

In this case, the above construction serves as both the positioning means and energy conservation mechanism. In detail, when the resistance against speed change is larger, the control wire W is pulled to rotate the positioning plate 62 clockwise in FIG. 19 to thereby swing the energy conservation arm 64 with respect to the arm 70 against the energy conservation spring 65. The wire W is pushed or loosened to rotate the positioning plate 62 counterclockwise in FIG. 19 through a spring 66 interposed between the positioning plate 62 and the base member 2 and to swing the energy conservation arm 64 with respect to the arm 70 by a restoring force of energy conservation spring 65. When the large resistance against speed change is released, the energy conservation spring 65 actuates the arm 70 against a return spring 67 to thereby transform the derailleur body A. When the resistance against speed change is normal, the energy conservation arm 64 and arm 70 are actuated in association with movement of positioning plate 62.

Also, the positioning means at the aforesaid derailleur is not indispensable. In case that the positioning and maintaining means is not used, the speed change device at the derailleur is provided with the positioning and maintaining means, or a control lever at the speed change device is given a rotational resistance to maintain the chain guide in the speed change position. In the latter case, even when the amount of movement of chain guide 13 is changed from 1 to 1+Δl, the control lever need not be changed of its operation stroke, whereby no shift in the display position occurs at the display means, and the speed change stage can be read with accuracy.

Although several embodiments have been described, they are merely exemplary of the invention and not to be constructed as limiting, the invention being defined solely by the appended claims.

What is claimed is:

1. A derailleur for a bicycle for switching a driving chain from one sprocket to another at a multistage sprocket assembly at the bicycle, comprising: a derailleur body comprising a base member, a movable member having a chain guide, and a support means which supports said movable member movably axially of said multistage sprocket assembly; an operating means which movably operates said movable member at said derailleur body; and an adjusting means which adjusts an amount of movement of said movable member in an axial direction of said multistage sprocket assembly with respect to a constant amount of operation of said operating means.

2. A derailleur for a bicycle according to claim 1, wherein said derailleur body further comprises a positioning means for said chain guide, said positioning means being interposed between a member movable relative to another member during movement of said movable member, said adjusting means for adjusting an amount of movement of said chain guide set by said positioning means with respect to said multistage sprocket assembly.

3. A derailleur for a bicycle according to claim 1, wherein said positioning means comprises a positioning plate having a plurality of engaging portions corresponding in number to a number of sprockets at said multistage sprocket assembly and an engaging member engageable with one of said engaging portions, said positioning plate comprising said adjusting means.

4. A derailleur for a bicycle according to claim 3, wherein said positioning plate is supported movably to a member movable relative to another member during movement of said movable member, said adjusting means being disposed between said movable member and said positioning plate.

5. A derailleur for a bicycle according to claim 3, wherein said engaging member is supported movably to a member movable relative to another member during movement of said movable member, said adjusting means being disposed between said movable member and said engaging member.

6. A derailleur for a bicycle according to claim 2, further comprising a position changing means for changing a position of said positioning means with respect to said base member.

7. A derailleur for a bicycle according to claim 1, wherein said derailleur body further comprises a linkage mechanism, said linkage mechanism comprising a base member, a pair of linkage members, and a movable member, said derailleur body further comprising an arm member for transforming said linkage mechanism, said arm member, when said linkage mechanism is transformed by operation of said arm member, being pivotally supported at one end to a member movable relative to another member including between another end and said another member and adjusting means changeable with respect to an engaging position.

8. A derailleur for a bicycle according to claim 1, wherein said positioning means comprises a positioning plate having a plurality of engaging portions corresponding in number to a number of sprockets at said multistage sprocket assembly and an engaging member engageable with one of said engaging portions, said engaging member comprising said adjusting means.

9. A derailleur for a bicycle according to claim 8, wherein said positioning plate is supported movably to a member movable relative to another member during movement of said movable member, said adjusting means being disposed between said movable member and said positioning plate.

10. A derailleur for a bicycle according to claim 8, wherein said engaging member is supported movably to a member movable relative to another member during movement of said movable member, said adjusting means being disposed between said movable member and said engaging member.

* * * * *